United States Patent [19]
Baumann

[11] Patent Number: 5,924,671
[45] Date of Patent: Jul. 20, 1999

[54] ROTARY VALVE ACTUATOR AND LINKAGE

[75] Inventor: Hans D. Baumann, Rye, N.H.

[73] Assignee: Fisher Controls International, Inc., Clayton, Mo.

[21] Appl. No.: 08/631,583

[22] Filed: Apr. 12, 1996

[51] Int. Cl.[6] .................................................. F16K 31/165
[52] U.S. Cl. .............................. 251/62; 251/58; 251/285
[58] Field of Search ................................ 251/58, 62, 285

[56] References Cited

U.S. PATENT DOCUMENTS

| | | | |
|---|---|---|---|
| 350,460 | 10/1886 | Leslie . | |
| 2,358,186 | 9/1944 | Pond | 251/58 |
| 2,839,319 | 6/1958 | Hobart | 287/3 |
| 2,856,214 | 10/1958 | Schrimshaw | 287/54 |
| 3,104,592 | 9/1963 | Sheesley | 251/58 |
| 3,261,266 | 7/1966 | Ledeen et al. | 92/138 |
| 3,709,106 | 1/1973 | Shafer | 251/58 |
| 3,727,523 | 4/1973 | Gulick | 92/130 |
| 3,801,062 | 4/1974 | Arn et al. | 251/58 |
| 3,985,151 | 10/1976 | Smith | 251/58 |
| 4,187,764 | 2/1980 | Cho | 91/442 |
| 4,345,850 | 8/1982 | Baumann | 403/373 |
| 5,305,987 | 4/1994 | Baumann | 251/298 |

FOREIGN PATENT DOCUMENTS

| | | |
|---|---|---|
| 0 023 120 | 1/1981 | European Pat. Off. . |
| 2 324 966 | 4/1977 | France . |
| 26 39 960 | 3/1977 | Germany . |
| 1 240 746 | 7/1971 | United Kingdom . |
| 1519583 | of 1978 | United Kingdom .............. F16D 1/06 |

*Primary Examiner*—A. Michael Chambers
*Attorney, Agent, or Firm*—Wolf, Greenfield & Sacks

[57] ABSTRACT

A rotary valve actuator and linkage provide an actuator having a tubular housing with end caps and a piston that is moved by fluid pressure against a compression spring. A rolling diaphragm is used to bias the piston. A pair of ports are provided on opposite sides of the housing and a linkage having two arms is interconnected with the piston through the ports. The linkage is coupled to a rotary valve shaft and linear movement of the piston causes rotational movement of the shaft. The linkage includes two separate arms and a centerpiece. The arms and the centerpiece interengage each other at angled surfaces that force the centerpiece and the arms into radial engagement with the shaft when axial compression is provided to the arms and centerpiece to force them toward each other.

27 Claims, 9 Drawing Sheets

ROTARY VALVE ACTUATOR AND LINKAGE

FIELD OF THE INVENTION

The present invention relates generally to a rotary valve actuator and linkage for an actuator and more particularly to a simplified actuator mechanism that can be produced at lower cost and occupies less space.

BACKGROUND OF THE INVENTION

It is common in the use of rotationally actuated valves such as rotary plug valves and butterfly valves, to employ an actuator that resolves a linear actuator translation into a rotational moment. This rotation is used to open and close the valve gate or plug. One such rotary valve is shown and described in U.S. Pat. No. 5,305,987 to Baumann. In this reference, a linkage is provided at the end of the shaft. This linkage is interconnected with a linear actuating device. Such actuators often include large mechanical housings that receive air and cause translation of the linear actuator component by interaction with a rolled diaphragm that moves in response to applied pressure. The housing is supported relative to the valve casing by a large framework that provides room for the required linkages to move.

The above outlined approach to constructing a rotary valve unit is effective but requires a good deal of space around the actual valve casing for the actuator mechanism. Similarly, the actuator mechanism is relatively complex and, thus, proves expensive to construct and service. Servicing, itself, is difficult because the housing must be assembled and disassembled under the pressure of a long compression spring. The assembly and disassembly requires the respective attachment and removal of several bolts and other components.

It has also been recognized that the linkages that resolve linear translation into rotational shaft movement are often prone to backlash and/or may be difficult to assemble onto a shaft. Many rotary valve shafts define a square cross-section which can create backlash if the linkage is not accurately sized to the shaft. A splined shaft would reduce backlash, but would make misalignment of the linkage more likely since the linkage can be positioned in a large number of rotational orientations. However, a square cross-section is more prone to enable play between the linkage and the shaft as the linkage is rotated to, in turn, rotate the shaft. The use of set screws or complicated clamps to increase the strength between the linkage and the shaft have been contemplated, but these structures add to the complexity of the interconnection between components and, thus, increase costs in assembly time for a valve. U.S. Pat. No. 4,345,850 to Baumann teaches a novel rotary valve linkage arrangement in which moments are generated in each of two opposing arms that "jam" the two arms into firm engagement with the square shaft end. The application of this linkage arrangement is limited to instances in which the two arms are in relatively close proximity to each other since the arms must bear against each other to generate the necessary moment for a secure engagement. It is, thus, desirable to provide a linkage that firmly engages a square cross-section shaft and, yet, enables a greater distance spacing between arm sections.

It is, therefore, an object of this invention to provide a rotary valve actuator assembly that is reliable, easy to maintain that occupies less space than a more-conventional actuator. This actuator should be employable with a variety of types of rotary valves and should enable rotation in each of opposing directions with relative accuracy. The actuator should generate sufficient torque to power most small to midsize valves. A linkage that can be used in conjunction with this actuator should enable firm engagement of a square or otherwise shaped shaft when two or more arms of the linkage are spaced at a predetermined distance from each other.

SUMMARY OF THE INVENTION

This invention overcomes the disadvantages of the prior art by providing an actuator having an elongated tubular housing with end caps that are attached free of screws or other removable attachment members. This invention also overcomes the disadvantages of the prior art by providing a linkage that becomes firmly attached to a flat side of a shaft using a wedge arrangement.

Accordingly to one embodiment, the rotary valve actuator assembly comprises a tubular housing that can be constructed from a seamless stainless steel tube. A piston, constructed typically from a synthetic, is mounted in the tubular housing and moves relevant to the tubular housing an elongated axis of the tubular housing. A linkage interengages the piston through a port in the tubular housing. The linkage can be formed with a pair of arms that engage opposing side of the piston. The arm can include blocks that slide along slots provided in the piston. As the piston moves along the axis, the arms rotate to rotate the rotary valve shaft. A fluid pressure source is coupled to the tubular housing and acts upon a rolling diaphragm that moves the piston in a predetermined direction against the force of a compression spring. A linkage housing is provided. The linkage housing is interconnected with a valve casing and the valve shaft projects through the linkage housing. The linkage housing supports the tubular housing and maintains the tubular housing stationarily relative to the shaft. The tubular housing is sized so that it can be located in each of opposite orientations relative to the linkage housing. At least one end cap of the tubular housing can be removably attached to the tubular housing using a snap ring. Another end cap of the tubular housing can be permanently attached to the tubular housing with an end of the tubular housing plastically deformed to retain the other end cap. The other end cap can be domed to accommodate high pressure.

The linkage according to this invention, which can be used with a variety of assemblies including the actuator described herein provides a shaft having at least one flat surface and a pair of arms with arm ends having holes that define a shape that is approximately the same as the shaft. A centerpiece, which in this embodiment, can include a stop member, is provided between the arms and includes a pair of oppositely directed wedges. The wedges are received by corresponding angled slots in each of the arm ends. When the arm ends are compressed together against the centerpiece, they generate components of force that drive the centerpiece and arm ends radially against the shaft. By increasing the compressor force, the radial driving force is increased. Such compressor force is provided by an end nut according to this embodiment. By way of example, round shafts with a flat surface, hexagonal shafts and square shafts can be used in conjunction with the linkage of this invention.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION OF THE PREFERRED EMBODIMENT

Figure 1:
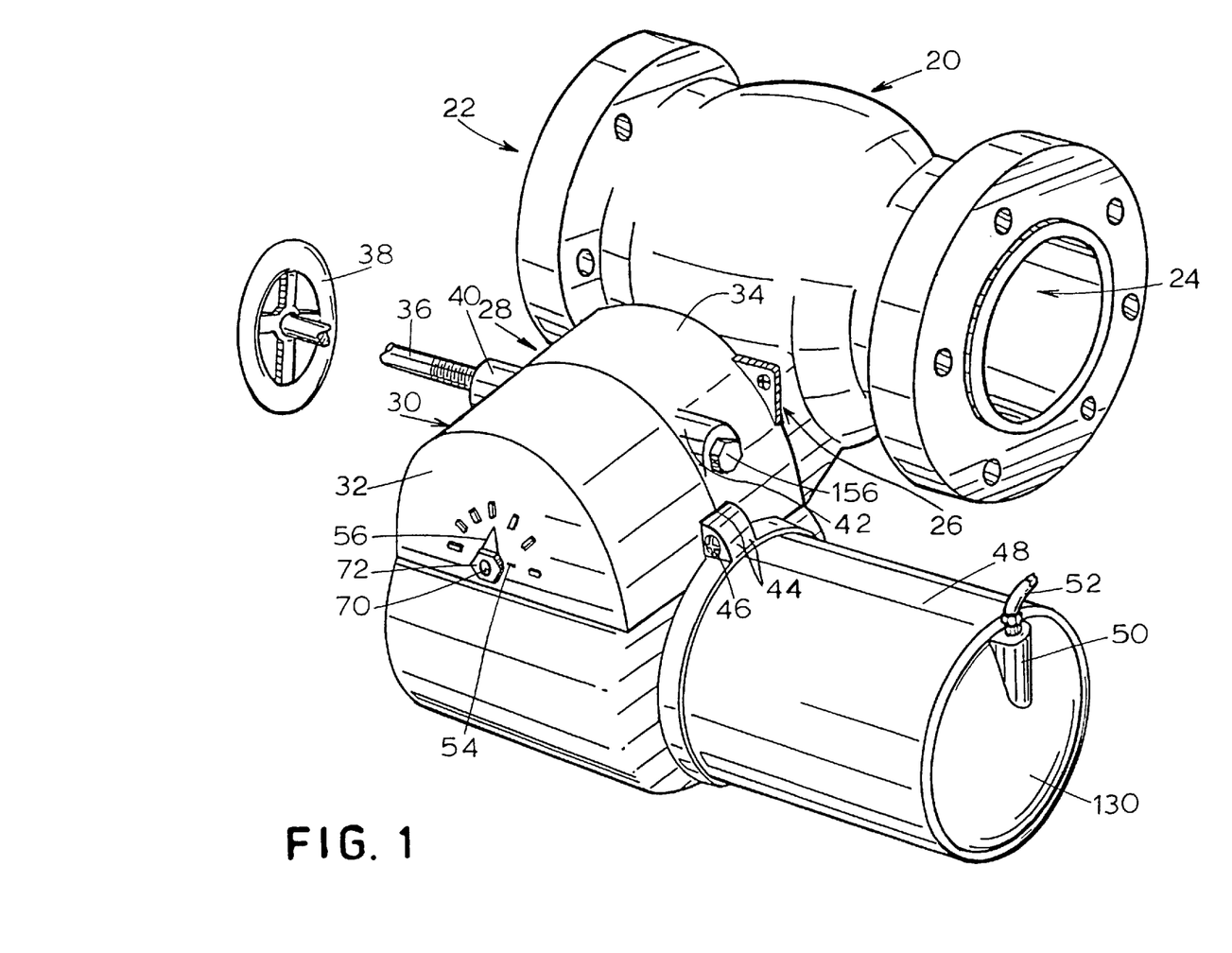
FIG. 1 is a perspective view of a rotary valve and actuator assembly according to this invention.

FIG. 1 illustrates, in overview, a rotary valve and actuator assembly according to this invention. The valve housing 20 can comprise any type of rotary-actuated valve in which a plug or gate element (not shown) regulates flow between an inlet 22 and an outlet 24 based upon rotational movement of the gate. The valve 20 is connected by a flange assembly 26 to the actuator assembly 28 of this invention. The actuator assembly comprises a housing 30 having a front half 32 and a rear half 34. The rear half engages the flange assembly 26. The housing 30 can be constructed from any appropriate material such as cast aluminum, iron or stainless steel. It can be formed using a casting or stamping process while relatively accurate fitment of the front and rear halves 32 and 34 is desirable, this portion of the housing is not typically airtight and, thus, a variety of inexpensive production processes can be used.

A manual override/limit-stop screw 36 and turn wheel 38 is provided. The screw 36 can be seated in each of two threaded bases 40 and 42 on the rear portion of the housing. The function of the screw 36 is described further below. In this embodiment, the front rear halves 32 and 34 are joined by a series of flanges 44 that receive bolts 46. The two halves 32 and 34 secure therebetween the actuator element 48 according to this invention. The actuator element 48 is formed as an integral unit and, this embodiment, receives fluid pressure through a fitting 50 that is interconnected with a pressure line 52. Fluid pressure in the form of air, another gas or a liquid is utilized to control movement of the actuator element 48 according to this invention.

Figure 2:
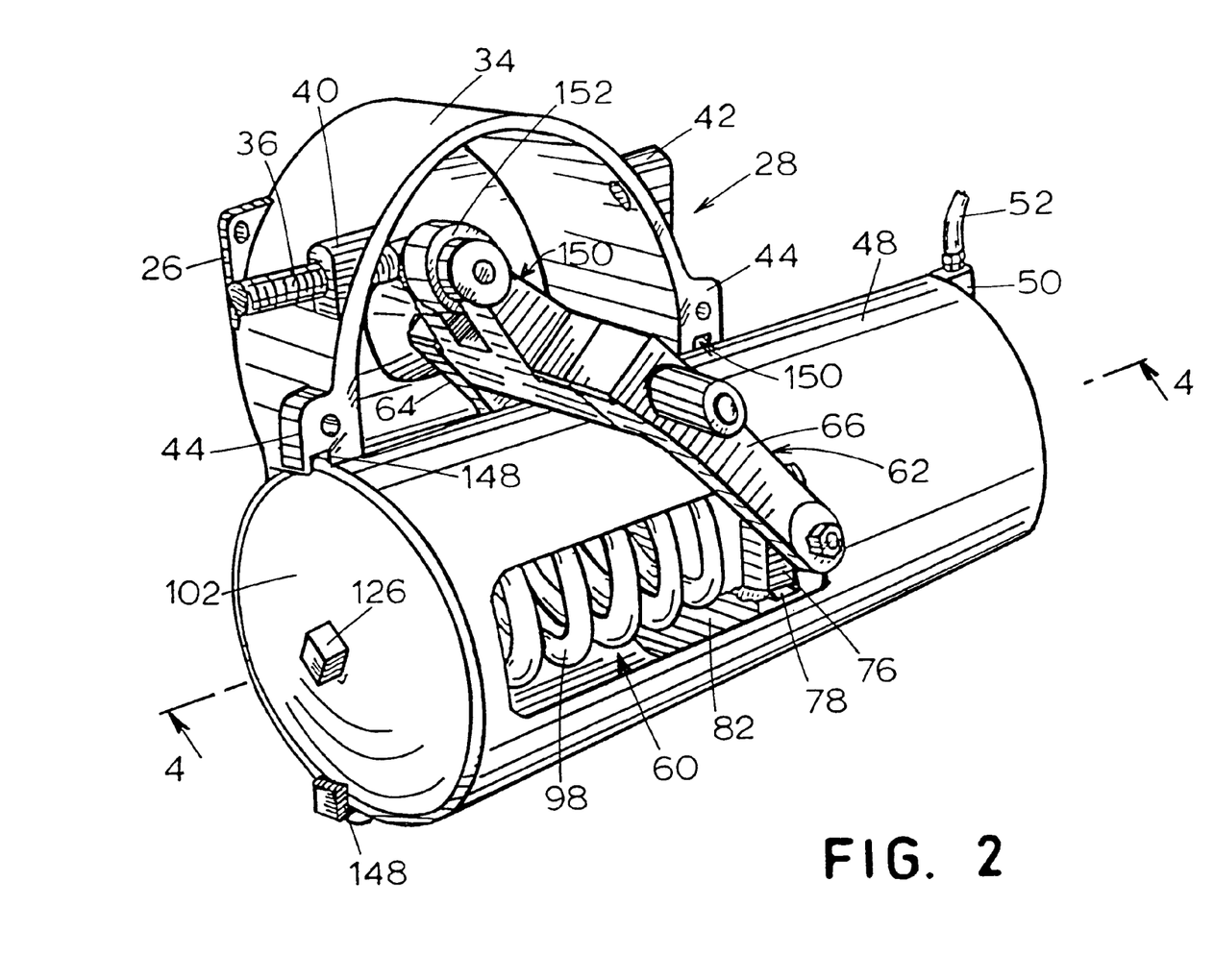
FIG. 2 is an exposed partial perspective view of the actuator assembly of FIG. 1.

Relative movement of the actuator is indicated in this embodiment by a scale 54 and moving pointer 56 (FIG. 1) that is attached to an end of the actuator linkage assembly which is shown in more detail in FIGS. 2, onward. With reference to FIGS. 2–5, the front half of the housing has been removed to reveal the inner workings of the actuator assemble. The actuator element 48 is formed from a seamless tube in this embodiment constructed from a durable material such as stainless steel. Readily available tube stock can be used according to this embodiment to reduce costs and manufacturing time in connection with the actuator element 48. The actuator element 48 includes a pair of opposing milled ports 60 that expose the interior of the tube. The linkage 62 is operatively connected with the actuator element 48 through the ports 60.

Figure 3:
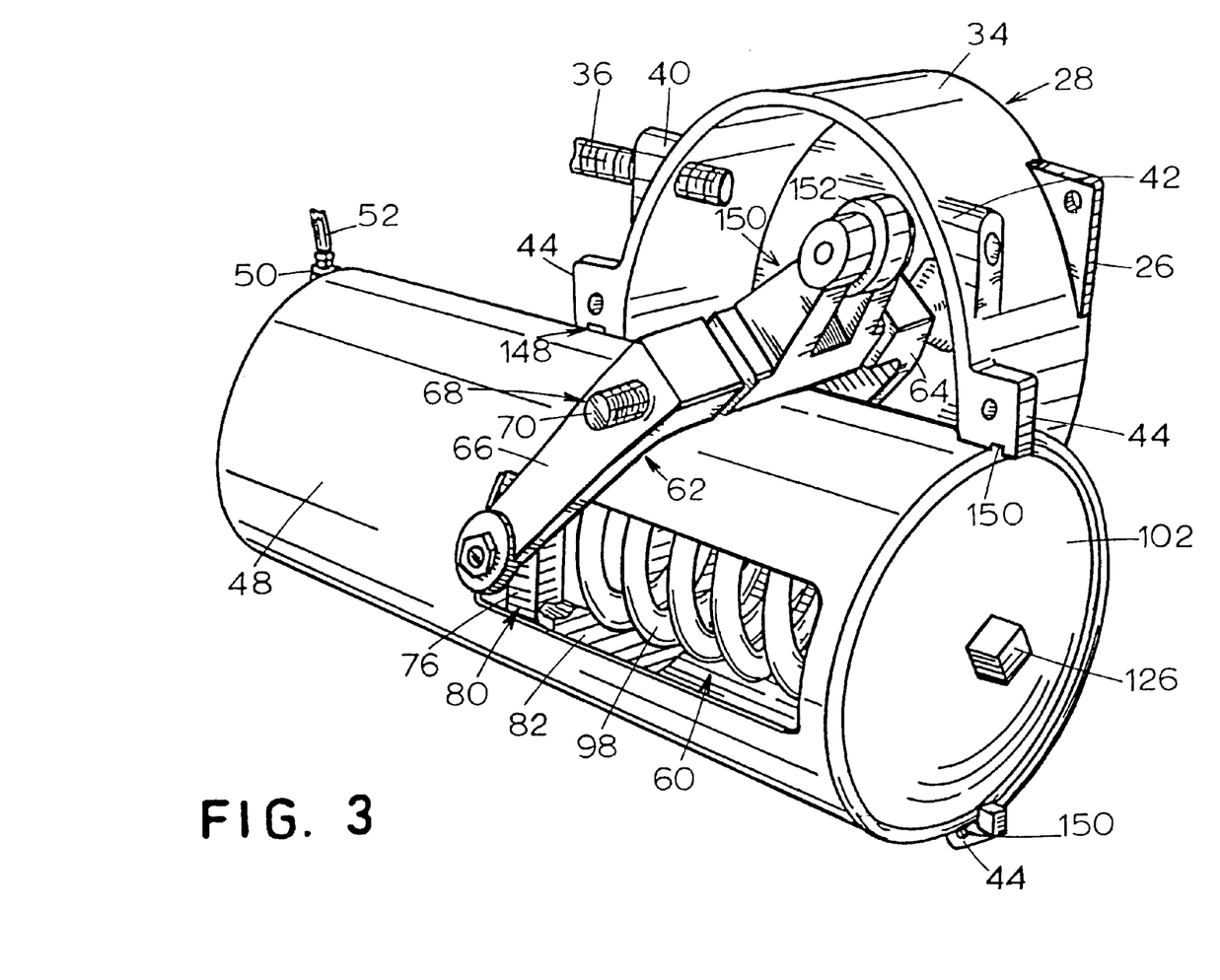
FIG. 3 is an exposed perspective view of the actuator assembly with the orientation of the actuator reversed.
Figure 4:
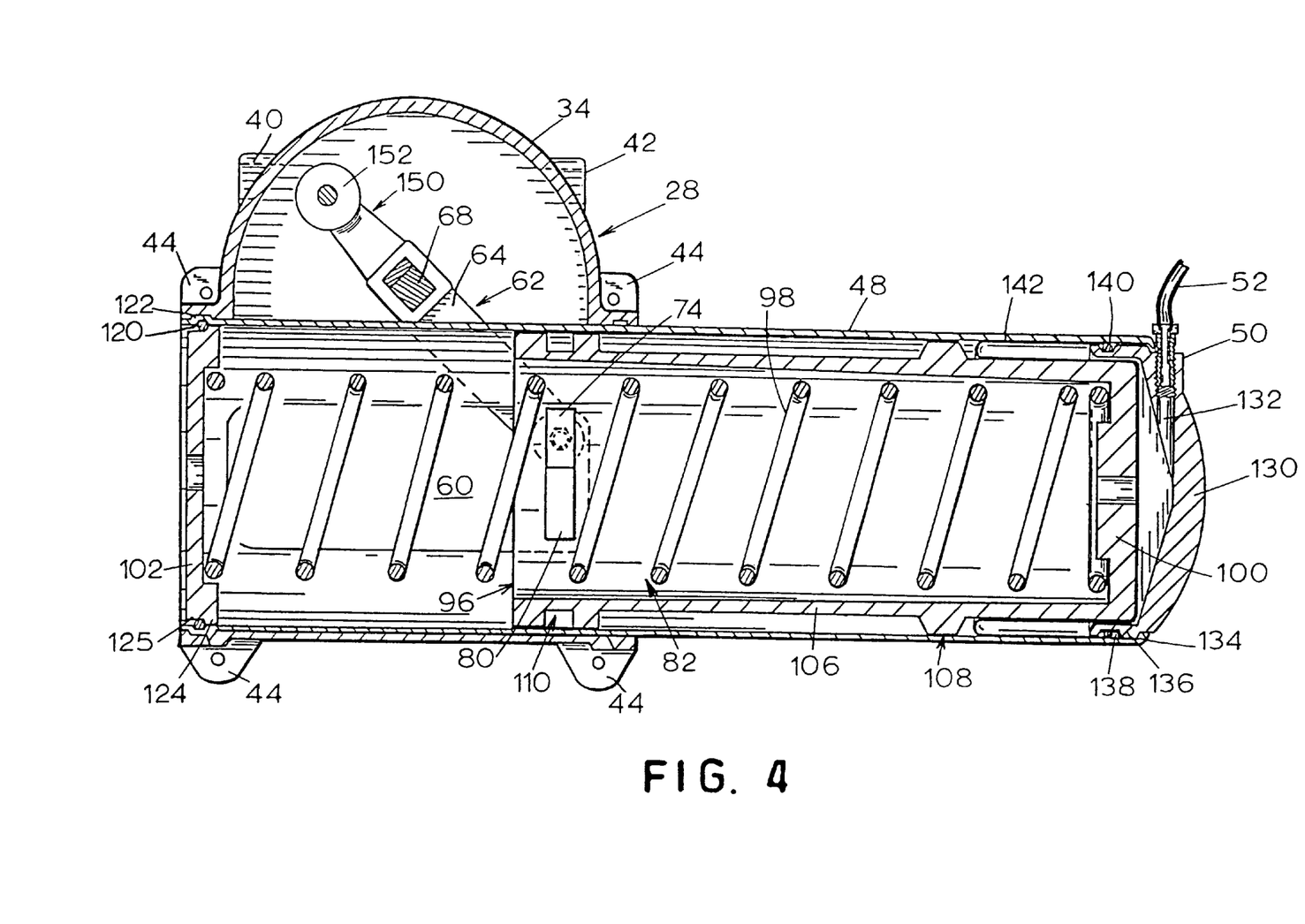
FIG. 4 is a side cross-section of the actuator assembly taken along line 4—4 of FIG. 2.
Figure 5:
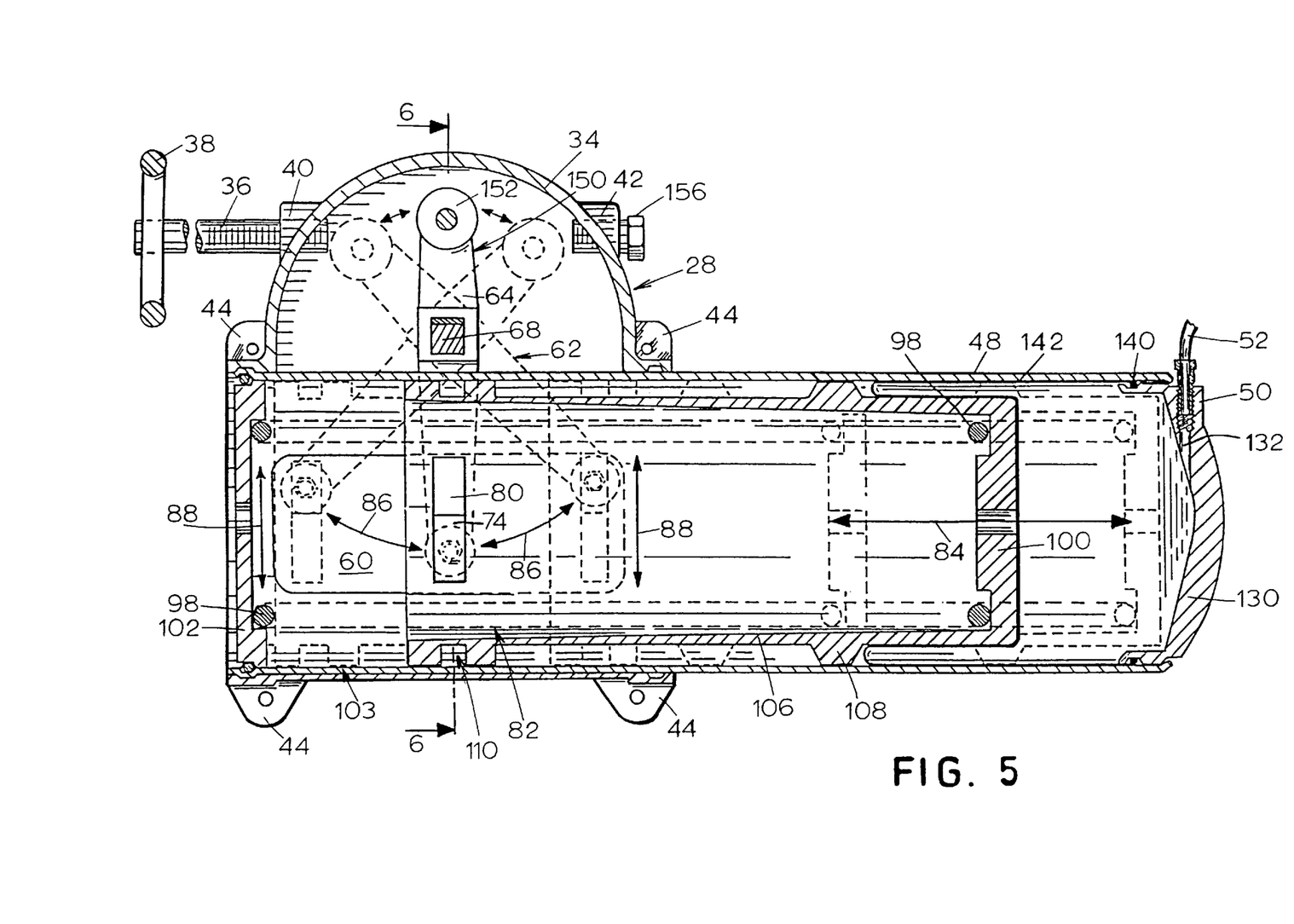
FIG. 5 is another cross-section of the actuator assembly illustrating relative positions of the actuator piston and linkage.
Figure 6:
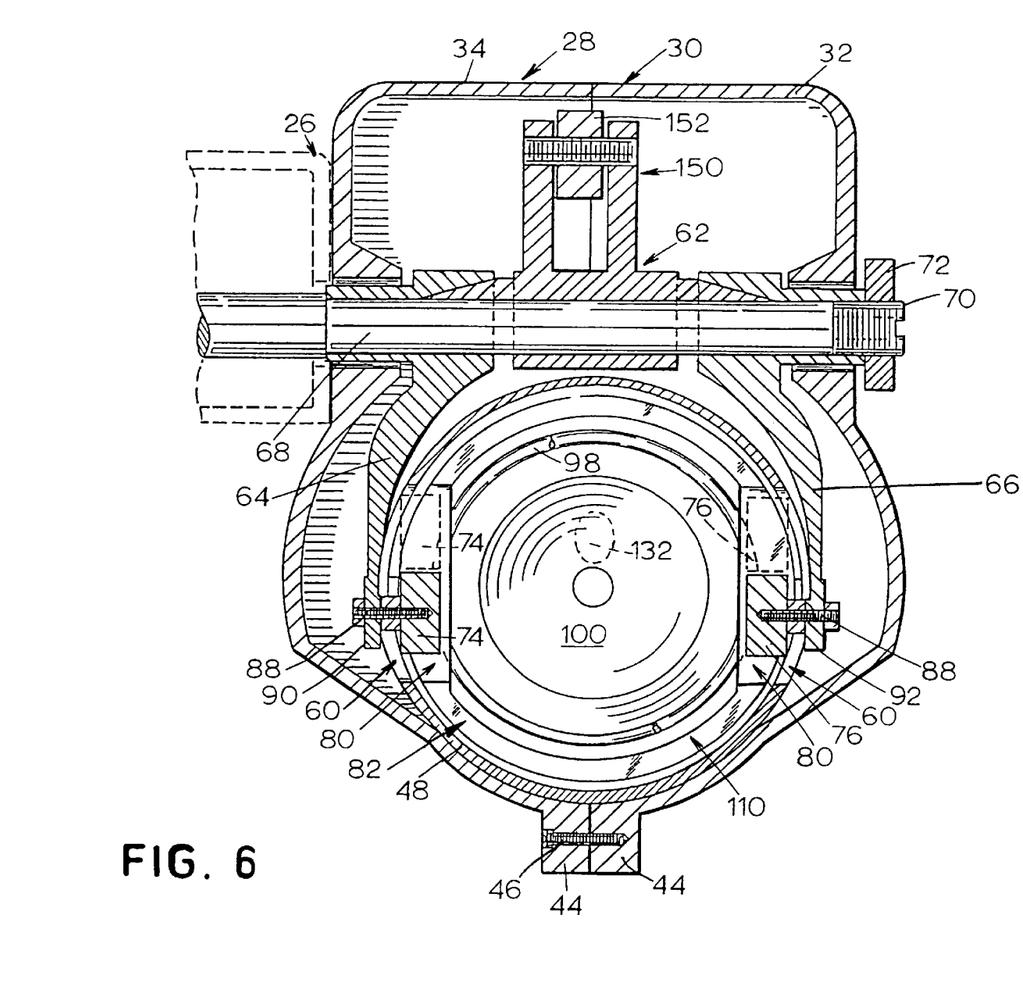
FIG. 6 is a front cross-section of the actuator assembly taken along line 6—6 of FIG. 5.

With further reference to FIGS. 4–6, the linkage 62 includes a pair of arms 64 and 66 that are seated firmly on a square cross-section shaft 68. The end 70 of the shaft 68 can be threaded (see FIG. 3) to receive a securing nut 72 as shown in FIG. 1. The mechanism for securing the arms 64 and 66 to the shaft 68 is described further below.

Each arm 64, 66 includes an associated guide block 74 and 76, respectively. The guide blocks are received by conforming slots 80 formed into the sidewalls of the actuator piston 82 of this invention. As detailed in FIG. 5, forward and rearward movement (double arrow 84) of the piston 82 within the actuator tube causes corresponding rotational movement (curved arrows 86) of the linkage 62. The blocks 74 and 76 move along respective slots 80 as the linkage 62 rotates (see double arrows 88 in FIG. 5). Hence, the slots accommodate positional change of the arm in a direction transverse to the central axis of the cylindrical tube. The block 74 and 76 pivot relative to their respective arms 64 and 66 to facilitate movement along the slots 80. Pivoting is accomplished using screws 88 that pivot freely relative to the arm ends 90 and 92 (FIG. 6). The piston in this embodiment is constructed from a durable plastic such as nylon or Delrin®. These materials are self-lubricating and, therefore minimal lubrication of the piston relative to the tube is required. The piston 82 includes a hollow center that is open at the front 96 to receive a spring 98. The spring bears upon the rear wall 100 of the piston 82 and upon a fixed front wall 102 of the tube. The spring constant and applied force of the spring relative to the piston is chosen so that the spring force is overcome and the piston is moved into a fully forward position (103 in FIG. 5) when maximum pressure is applied to the actuator. In this embodiment, a maximum pressure of approximately 100 psi is contemplated generating a maximum force of approximately 500 pounds within the piston and a torque of approximately 450 inch pounds. These values can be changed depending on the size and function of the actuator assembly according to this invention.

The piston 82 of this embodiment includes a main wall section 106 that is spaced from the inner wall of the tube. Two sets of guide rings 108 and 10 engage the inner wall of the tube. By minimizing a surface contact between the piston 82 and the inner wall of the tube, friction is reduced and the risk of binding between components is minimized. The rear ring 108 has a diameter that is approximately $\frac{1}{16}$ smaller than the inner diameter of the tube. The outer ring 110 is more closely conforming in diameter to the inner diameter of the tube. The port 60 makes more likely deformation of the tube and, thus, the more closely conforming front ring assembly 110 provides additional support to the tube at its weakest point.

As noted above, the tube of the actuator element 48 is constructed from a seamless stainless steel tube. For the depicted valve, the diameter of the tube is approximately 4 inches. Wall thickness is approximately $\frac{1}{16}$ inch. The front end cap 102 is removable for servicing of the interior of the element 48. A snap ring 120 is seated within a recess 122 formed within the tube. The recess has sufficient depth to prevent the snap ring from moving axially out of the tube opening. The end cap 102 which is constructed from stainless steel or a similar durable material includes a shoulder 124 that bears against the snap ring. As detailed in FIGS. 2 and 3, a plastic cap 126 can be installed in a hole in the end cap. This hole and cap 126 can be omitted, however. The end cap 102 is installed and removed by biasing the cap inwardly against the spring 98 until it is clear of the snap ring 120. Once the end cap 102 is cleared of the snap ring 120, it can be removed or installed relative to the recess 124. Snap rings having large diameters as shown are available from a variety of commercial sources in Germany and elsewhere. When under spring load, it is impossible to dislodge the snap ring 120 since the peripheral shoulder 125 of the cap 102 tightly engages the inside diameter of the snap ring thereby preventing the snap ring from moving radial inwardly out of the groove 122.

The actuator element 48 also includes an opposing base cap 130 that is cast or formed into a domed shape. This domed shape aids in the maintenance of high pressure. A port 132 places the fluid line 52 in communication with the interior of the actuator element in the vicinity of the end cap 130. The end cap 130 is secured to the tube of permanently by a plastically deformed end wall 134 formed in the rear end of the tube. The deformed end wall prevents the end cap 130 for moving axially outwardly away from the tube. Appropriate welds or solder joints can also be applied between the tube and the end cap. It is generally contemplated that the end cap 130 is pressed in. The end cap 130 includes an approximately cylindrical interior wall section 136 that engages the inner wall of the tube. The interior wall section 136 includes a recess 138 for receiving the base 140 duplicating as a radial static seal of a rolling diaphragm 142. The rolling diaphragm is available from a variety of commercial sources. In this embodiment, it is a nitrile-rubber reinforced fabric having a thickness of approximately 0.04 inch. The rolling diaphragm occupies the space between the main wall 106 of the piston 82 and the inner wall of the tube to the rear of the ring 108. As shown in FIG. 5, pressure causes the diaphragm to bear upon the rear wall 100 of the piston 82, thus moving the piston forwardly to the front end cap 102. The diaphragm forms a positive fluid seal within the rear of the actuator element 48. Thus, the actuator and piston assembly are open and unsealed forwardly of the diaphragm 142. It should be clear from this description that the actuator element 48 shown and described is relatively easy to construct and maintain and takes up less space than conventional actuators. It is constructed substantially free of screws or other fasteners and can be considered disposable when damaged. However, servicing of the actuator is possible via the removable front cap 102, as noted above. In addition to the above-described advantages, FIG. 2 and FIG. 3 show the added versatility of the actuator assembly according to this invention. The recess 122 adjacent the front cap 102 serves as a locating ring that seats within corresponding recesses 148 within the rear housing half 34 (FIG. 2). The actuator element 48 is sized symmetrically so that it can be rotated 180° and seated in an opposing set of recesses 150 within the rear housing half 34 (FIG. 3). Hence, the actuator element 48 can be positioned to operating each of opposing directions relative to the valve by a simple relocation process. In this embodiment, the unused set of recesses (e.g. the recesses that do not engage the front cap assembly can be filled with an O-ring of appropriate size and thickness to more securely seat the midsection of the actuator element 48.

The upper portion of the linkage 62 includes a stop structure 150 that rotates in conjunction with the arms 64 and 66 (FIG. 5). The stop structure includes a roller 152 that reduces friction when it engages the threaded stops located within the bases 40 and 42. As described above, the screw 36 and an opposing screw (156 in FIG. 5) if desired can be moved relative to their respective bases 40 and 42 to define the limit stop positions of the linkage 62. Otherwise, the limit stop positions are defined by the minimum and maximum travel of the piston 82 within the tube of the actuator element 48. The screw 36 can also be used as a manual override in the event of pressure failure. As the screw is turned in, it causes the stop structure 150 to rotate the shaft 68, thus moving the valve gate (not shown). Movement of the stop structure 150 overcomes force imparted by the spring 98.

Figure 7:
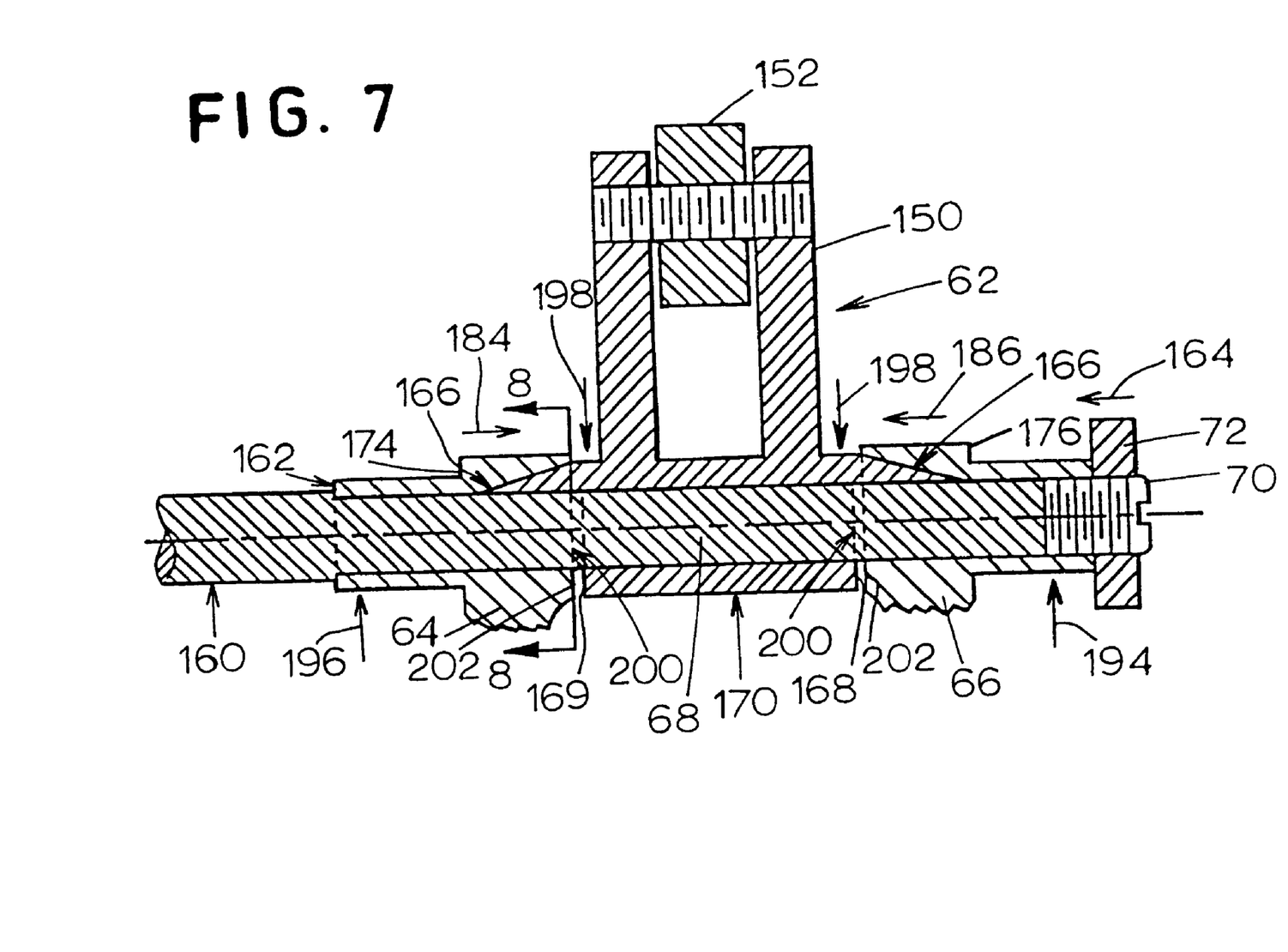
FIG. 7 is a partial cross-section of the linkage for use with the actuator assembly according to this invention.
Figure 8A:
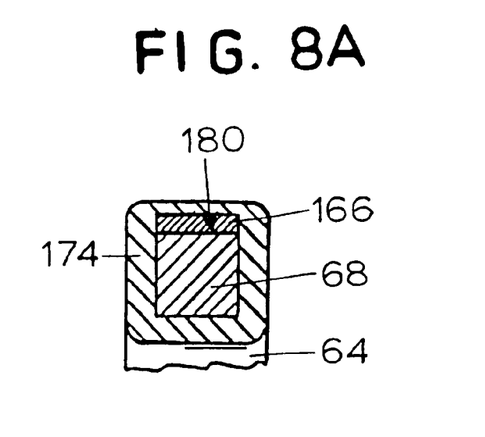
FIGS. 8A, 8B and 8C are partial cross-sections of shafts and conforming linkages taken along line 8—8 of FIG. 7.
Figure 8B:
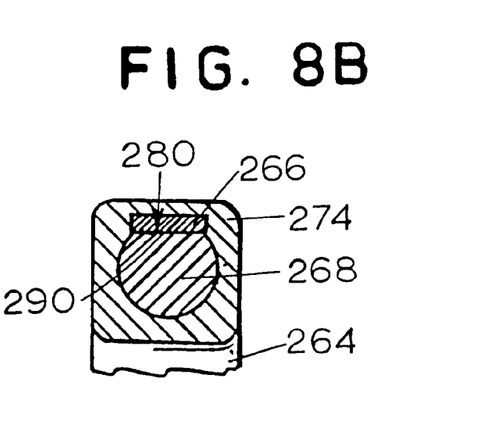
Figure 8C:
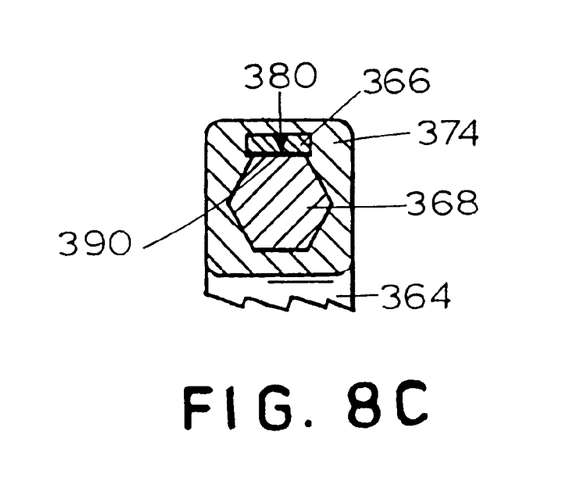
Figure 9:
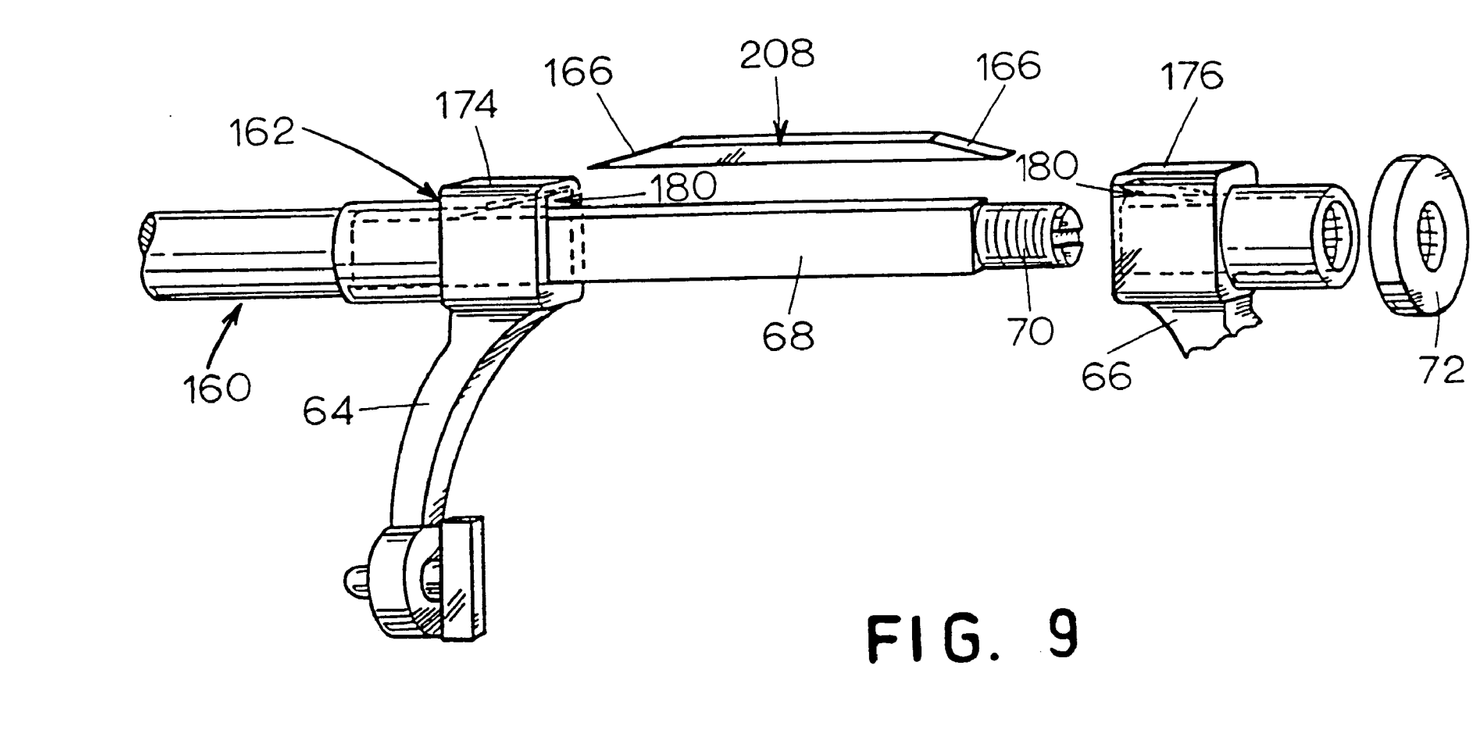
FIG. 9 is a somewhat schematic exploded view of a linkage and wedge system for use with a square cross-section shaft according to this invention.

With further reference to FIGS. 7–9, the securing mechanism for a linkage 62 according to this invention is shown and described. FIG. 7 particularly illustrates the mounting of the linkage 62 on a square cross-section shaft 68 that is interconnected with the gate of a rotary valve (not shown). In this embodiment, the square cross-section portion of the shaft 68 is formed from a larger diameter round shaft in which the round portion 160 of the shaft defines a shoulder 162 against which an inner end of the arm 64 abuts. The free end of the shaft 68 in this embodiment is rounded and provided with an end section 70 having threads for receiving a nut 72. The length of the square cross-section portion of the shaft is chosen so that the nut 72 can be fully tightened to apply force (arrow 164) to the linkage assembly 62.

In this embodiment, the stop portion 150 defines a center piece of the linkage 62. It includes a square cross-section hole that relatively closely conforms to the size and shape of the square cross-section shaft 68. In this embodiment, opposing upper legs of the stop structure 150 define wedges 166 that extend in an opposing directions away from the stop structure. In particular, the wedges 166 define extensions that extend beyond the end walls 168 of the lower portion 170 of the stop structure 150. Referring also to FIGS. 8A and 9, each arm 64 and 66 includes a respective mounting base or arm end, 174 and 176 also having a square cross-section hole formed therein. These holes conformed to the size and shape of the shaft 68. Each arm end 174 and 176 also includes an inner facing triangular recess 180 that is sized and arranged to receive a respective wedge 166. The angle of the wedge can be approximately 15° more or less. This angle can be varied depending upon the application. With reference again to FIG. 7, by exerting force (arrow 164) on the linkage 62, the opposing arm ends 174 and 176 are forced into compression (arrows 184 and 186, respectively) against the wedges 166 of the stop structure 150. Since the wedges and conforming slots in the arm ends 174 and 176 are angled, they resolve the compressive force (arrows 184 and 186) into perpendicular force components (arrows 194, 196 and 198) that drive the arm arm ends 174 and 176 and the stop structure 150 into firm engagement with the flats of the shaft 68. The tighter the nut 72 is twisted onto the shaft end 70, the stronger the engagement of the linkage components with the flats of the shaft 68. So long as the walls of the shaft ends 174 and 176 are made sufficiently robust, a very substantial locking force can be imparted to the linkage components. This locking force substantially reduces the possibility of backlash when the arms 64 and 66 are actuated to rotate the shaft 68.

Note that, as depicted in FIG. 7, a gap 200 should be provided between the end walls 168 of the stop structure and the corresponding end walls 202 of each arm end 174 and 176. Without such a gap, the components may not have sufficient room to move perpendicularly into a fully engaged position with the flats of the shaft 68.

It should be clear that the basic principle described herein is applicable to a variety of shaft shapes. It is generally desirable that the shaft have at least one flat. For example, FIGS. 8B and 8C show shafts 268 and 368 that are, respectively, round and hexagonal. Each shaft 268 and 368 includes at least one flat 290 and 390 upon which a wedge 266 and 366 can seat. The respective arm end 274 and 374 includes a hole that conforms to the shape of the shaft with an appropriate angled cut out 280 and 380, respectively. For receiving the wedge 266 and 366. Likewise, the central wedge-carrying portion need not include a surrounding housing with a hole for receiving the shaft. Rather, as shown in FIG. 9, the center piece can comprise a single one-piece plate 208 with wedges 166 defined at either end. The length of the plate 208 or another wedge-carrying structure is infinitely variable and, thus, the arms can be positioned at a substantial distance from each other according to this invention. Furthermore, while the shaft includes an abutting wall 162, nuts or other fastening structures can be provided at both ends and adjusted to change the compression force and location of the linkage as appropriate.

It should be clear that the arm attachment mechanism described herein enables arms and shafts to be made at a slightly lower tolerance while still enabling a relatively backlash-free fit. Arms can be made using casting processes or other forming processes according to this embodiment.

The foregoing has been a detailed description of a preferred embodiment. Various modifications and equivalents can be made without departing from the spirit and scope of this invention. For example, while a rolling diaphragm is used according to this embodiment, a sealed piston can be substituted when desirable. The size and shape of components can be varied for use with different types of rotary valves and the actuator assembly described herein can be used with or without the unique linkage attachment mechanism as shown and described. Similarly, the linkage attachment mechanism can be applied to other structures in which it is desirable to secure arms to shafts using a quick and inexpensive technique. Accordingly, this description is meant to be taken only by way of example and not to otherwise limit the scope of the invention.

What is claimed is:

1. A rotary valve actuator assembly comprising:
   a tubular housing having a pair of ports on opposing sides thereof;
   a piston mounted in the tubular housing and movable relative to the tubular housing along an elongated axis of the tubular housing;
   a linkage including a pair of arms that engage the piston through said ports in the tubular housing, said linkage being interconnected with a rotating shaft located entirely externally of said tubular housing, wherein movement of the piston along the axis causes the linkage to rotate the shaft; and
   a fluid pressure source coupled with the housing for moving the piston along the axis.

2. The rotary valve actuator assembly as set forth in claim 1 further comprising a linkage housing that receives the tubular housing and that maintains the tubular housing stationarily relative to the shaft.

3. The rotary valve actuator assembly as set forth in claim 2 wherein the tubular housing includes a rolling diaphragm positioned between a closed end of the tubular housing and the piston.

4. The rotary valve actuator assembly as set forth in claim 3 further comprising a compression spring located between an end of the tubular housing and a portion of the piston remote from the rolling diaphragm for biasing the piston in a predetermined direction that is overcome by application of fluid pressure.

5. The rotary valve actuator assembly as set forth in claim 4 wherein the arms include pivoting blocks that slide along slots formed in the piston.

6. The rotary valve actuator assembly as set forth in claim 5 wherein the shaft includes at least one flat surface thereon and wherein the arms include arm ends each having conforming flats that engage the flat on the shaft.

7. The rotary valve actuator assembly as set forth in claim 6 wherein the shaft comprises a square cross-section shaft having four flats.

8. The rotary valve actuator assembly as set forth in claim 7 further comprising a stop structure located between each of the arms and extending in a direction opposite a direction of extension of the arms, and further comprising at least one adjustable stop constructed and arranged to engage the stop structure at predetermined variable locations to limit rotation of the shaft.

9. The rotary valve actuator assembly as set forth in claim 8 wherein the stop structure includes a roller that engages the adjustable stop.

10. The rotary valve actuator assembly as set forth in claim 9 wherein the adjustable stop comprises a screw and wherein the linkage housing includes a threaded base for receiving the screw.

11. The rotary valve actuator assembly as set forth in claim 10 wherein each of the arm ends includes an angled slot and wherein the stop structure includes a pair of opposing wedges and wherein the slot and the wedges are constructed and arranged to interengage so that each of the arm ends and the stop structure bear against the shaft under axial pressure.

12. The rotary valve actuator assembly as set forth in claim 1 wherein the piston comprises a synthetic material.

13. The rotary valve actuator assembly as set forth in claim 12 wherein the piston includes guide rings having diameters that are approximately equal to the diameter of an inner wall of the tubular housing and wherein the piston includes a main wall that is remote from the inner wall of the tubular housing.

14. The rotary valve actuator assembly as set forth in claim 1 wherein the tubular housing, comprises a seamless stainless steel tube.

15. The rotary valve actuator assembly as set forth in claim 14 wherein the tubular housing includes a removable end cap retained in the tubular housing by a snap ring.

16. The rotary valve actuator assembly as set forth in claim 15 further comprising a recess for receiving the snap ring formed in an inner wall of the tubular housing.

17. The rotary valve actuator assembly as set forth in claim 16 further comprising a linkage housing for holding the tubular housing, the linkage housing including a recess for receiving a projection formed in an outer wall adjacent the recess for receiving the snap ring.

18. The rotary valve actuator assembly as set forth in claim 17 wherein the linkage housing includes two pairs of recesses each for receiving the projection of the tubular housing in each of opposing orientations of the tubular housing relative to the linkage housing.

19. A linkage for a rotary shaft comprising:
   a shaft mounted so as to be rotatable, the shaft including at least one flat surface extending therealong over a portion thereof and the shaft having an elongated axis;
   an abutment located along the shaft;
   a pair of arms having arm ends, the arm ends having holes sized and arranged to pass over the portion of the shaft having the flat surface, each of the holes including an angled recess;
   a wedge structure having a predetermined length and a pair of wedge surfaces sized and arranged to interengage with the angled recess in each of the arm ends; and an adjustable end stop that applies a force to each of the arm ends and the wedge structure in the direction of the axis, wherein at least one of the arm ends bears against the abutment so that each of the arm ends are forced into engagement with the shaft and the wedge structure is forced into engagement with the flat surface.

20. The linkage as set forth in claim 19 wherein the wedge structure includes a body having a hole sized and arranged to pass over the portion of the shaft having a flat surface and wherein the body has end edges over at least a portion thereof.

21. The linkage as set forth in claim 20 wherein the wedge surfaces extend outwardly of the end edges.

22. The linkage as set forth in claim 21 when the wedge surfaces are sized and arranged to extend along and in engagement with the flat surface.

23. The linkage as set forth in claim 19 wherein the shaft comprises a shaft having a square cross-section.

24. The linkage as set forth in claim 19 when the shaft comprises a shaft having a round cross-section on a portion thereof.

25. The linkage as set forth in claim 19 wherein the shaft comprises a shaft having a hexagonal cross-section.

26. The linkage as set forth in claim 19 wherein the wedge structure includes a stop structure extending therefrom sized and arranged to engage at least one stop when the shaft rotates to a predetermined angular location.

27. A rotary valve actuator assembly comprising:

a linkage housing interconnected with a valve casing having a valve shaft extending therethrough;

a tubular housing supported by the linkage housing and having a piston therein that moves along an elongated axis of the tubular housing in response to applied fluid pressure;

a linkage interconnected between the piston and the shaft to translate linear motion of the piston into rotational motion of the shaft;

a compression spring that biases the piston in a predetermined direction with a biasing force, the biasing force being overcome by the fluid pressure;

end caps located at opposite ends of the tubular housing, the end caps being attached to the tubular housing free of threaded fasteners; and a snap ring located at one end of the tubular housing constructed and arranged to removably retain one of the end caps.

* * * * *